B. GIFFORD.
Sheep Pen.
No. 61,190.
Patented Jan'y 15, 1867.
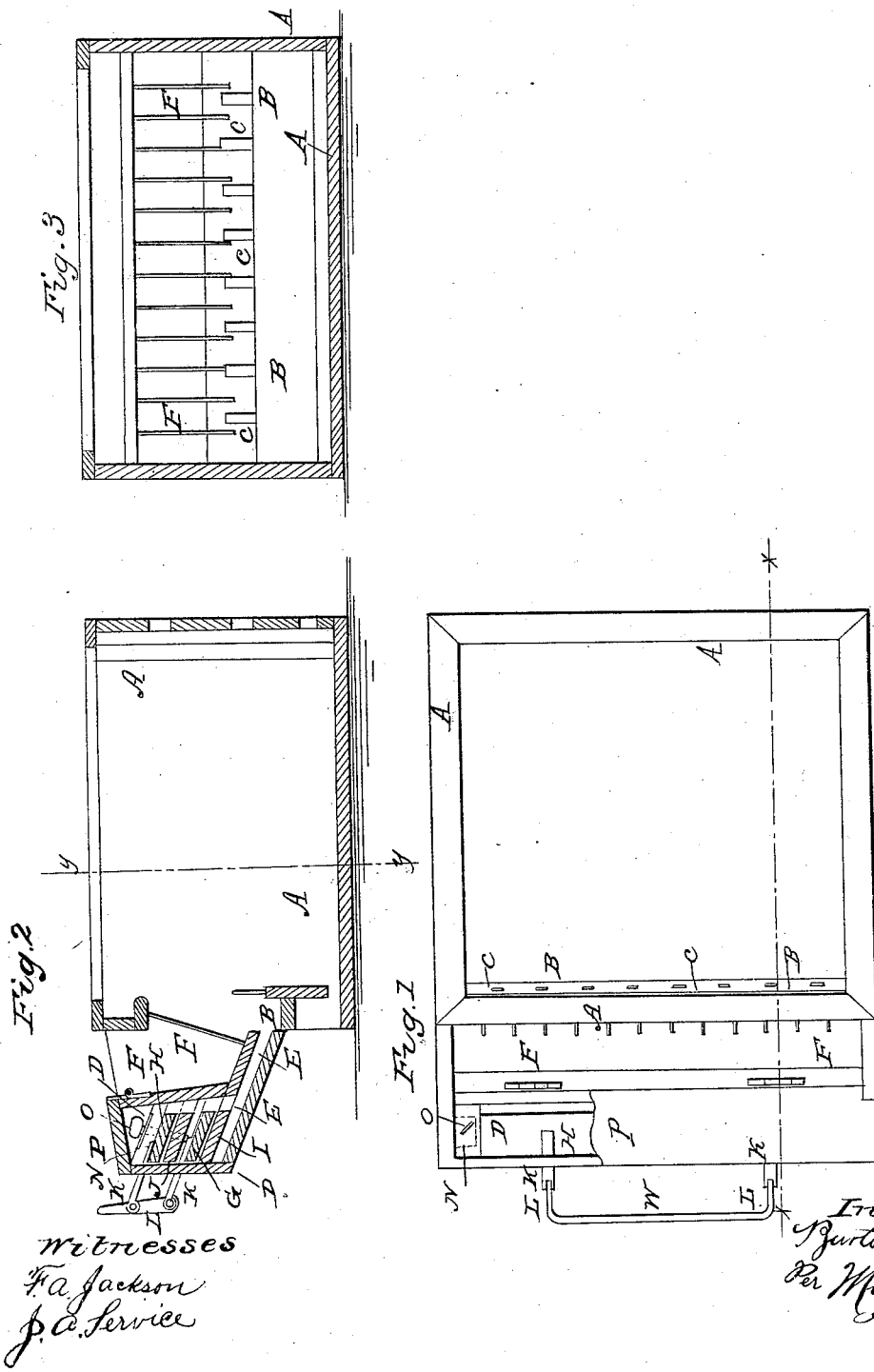

United States Patent Office.

BURTON GIFFORD, OF PEDEE, IOWA.

Letters Patent No. 61,190, dated January 15, 1867.

---

IMPROVEMENT IN SHEEP PEN.

---

The Schedule referred to in these Letters Patent and making part of the same.

---

TO ALL WHOM IT MAY CONCERN:

Be it known that I, BURTON GIFFORD, of Pedee, in the county of Cedar, and State of Iowa, have invented a new and improved Sheep Pen; and I do hereby declare that the following is a full, clear, and exact description thereof, which will enable others skilled in the art to make and use the same, reference being had to the accompanying drawings, forming part of this specification, in which—

Figure 1 is a top or plan view of my improved sheep pen, part of the cover of the feed receptacle being broken away to show the construction.

Figure 2 is a vertical longitudinal section of the same taken through the line $x\ x$, fig. 1.

Figure 3 is a vertical cross-section of the same taken through the line $y\ y$, fig. 2.

Similar letters of reference indicate like parts.

My invention has for its object to economize feed and time in feeding sheep, and to promote their healthy condition; and it consists in forming the feed-box upon or attaching it to the outside of the sheep pen; in the combination of the sliding boards and levers with the feed-box; in the combination of an adjustable board with the slide-boards and feed-box; and in connecting the feeding-trough with the feed-box by a channel or spout passing beneath the rack; the whole being constructed and arranged as hereinafter more fully described.

A is the pen, into which the sheep are admitted through a door in the ordinary manner. B is the feeding-trough, which is placed a little above the floor at the forward end of the pen A. C are pins or bars, projecting upward from the edge of the trough B, so as to confine each sheep to its own particular place while feeding. D is the feed or grain-box, which is formed upon or attached to the forward side of the pen A. The box D communicates with the feeding-trough B, through the spout or channel E, which passes beneath the hay-rack F, as shown in fig. 2. G and H are sliding-boards placed in the feed-box D, the lower one, G, of which slides upon the stationary board I, and the upper one, H, slides upon the adjustable board J. To the boards G and H are attached arms K, which project out through the side of the box D, and to the ends of which are pivoted the levers L, as shown in figs. 1 and 2. The upper ends of the levers L are connected by a bar, M, so that they may be more conveniently operated together. The bar M and levers L may be made in one piece, if desired, by bending the ends of said bar down so as to form the said levers, as shown in fig. 1. N are side bars or blocks securely attached to the ends of the feed-box D, from which the board J is adjustably suspended, by means of the set-screws O, which pass down through notches or slots in the ends of the sliding-board H, and screw into the said board J, as shown in fig. 2. P is the hinged cover of the feed-box, which is hinged to the upper edge of its rear side as shown. F is the hay-rack, which is formed at the rear of the feed-box D, and above and a little in front of the feeding-trough B, as shown in fig. 2, and which is furnished with slats in the ordinary manner. In feeding the sheep, the upper sliding-board H is pushed back so as to close the passage way to the trough B, and any desired amount of grain is then placed in the box. The lower sliding-board G is then pushed in and the board H drawn out. This allows the grain to flow down and fill the space between the boards G and H. This space may be enlarged or diminished at pleasure, by means of the set-screw O and board J, so as to regulate the amount of grain fed to the sheep at one time as desired. The upper board H is then pushed in to prevent any more grain from flowing down, and the board G is drawn out, allowing the grain between the boards H and G to flow down into the trough B.

What I claim as new, and desire to secure by Letters Patent, is—

1. Forming a feed-box D, upon or attaching it to the outside of the sheep pen A, substantially as herein shown and described.

2. The combination of the sliding-boards H and G, and levers L, with the feed-box D, substantially as herein shown and described.

3. The combination of the adjustable board J, with the sliding boards H and G, and with the feed-box D, substantially as herein shown and described.

4. Connecting the feeding trough B, with the feed-box D, by the spout or channel F, substantially as herein shown and described.

BURTON GIFFORD.

Witnesses:
    WM. R. KELLY,
    ASA GREGG.